United States Patent
Moorthy et al.

(10) Patent No.: US 9,806,958 B1
(45) Date of Patent: Oct. 31, 2017

(54) SYSTEMS AND METHODS FOR ENABLING MULTIPLE-PERSPECTIVE ADMINISTRATION OF COMPUTING SYSTEMS

(71) Applicant: Symantec Corporation, Mountain View, CA (US)

(72) Inventors: Naresh Moorthy, Sunnyvale, CA (US); Prashant Monteiro, Pune (IN); Venkeepuram Satish, Fremont, CA (US); Subhadeep De, Sunnyvale, CA (US); Vidyut Kaul, Mountain View, CA (US); Bharat Dighe, Sunnyvale, CA (US)

(73) Assignee: Veritas Technologies LLC, Mountain View, CA (US)

( * ) Notice: Subject to any disclaimer, the term of this patent is extended or adjusted under 35 U.S.C. 154(b) by 329 days.

(21) Appl. No.: 14/572,817

(22) Filed: Dec. 17, 2014

Related U.S. Application Data

(60) Provisional application No. 61/917,913, filed on Dec. 18, 2013.

(51) Int. Cl.
*G06F 15/173* (2006.01)
*H04L 12/24* (2006.01)

(52) U.S. Cl.
CPC .................... *H04L 41/22* (2013.01)

(58) Field of Classification Search
CPC ........... H04L 41/0213; H04L 29/08072; H04L 29/06
USPC ........................................................ 709/223
See application file for complete search history.

(56) References Cited

U.S. PATENT DOCUMENTS

| | | | |
|---|---|---|---|
| 8,600,947 B1 | 12/2013 | Freiheit et al. | |
| 8,712,967 B1 | 4/2014 | Weaver et al. | |
| 2009/0327908 A1* | 12/2009 | Hayton | G06F 21/6218 715/744 |

(Continued)

OTHER PUBLICATIONS

Milind Torney; Systems and Methods for End-User Initiated Data-Loss-Prevention Content Analysis; U.S. Appl. No. 12/558,930, filed Sep. 14, 2009.

(Continued)

*Primary Examiner* — Alan S Chou
(74) *Attorney, Agent, or Firm* — FisherBroyles LLP

(57) ABSTRACT

The disclosed computer-implemented method for enabling multiple-perspective administration of computing systems may include (1) receiving, from a user, a request to administer a computing system that includes a plurality of types of components, (2) identifying an administrative role of the user, (3) identifying a primary component of a primary type of component that is administered by the user in the administrative role, (4) identifying a secondary component of a secondary type of component that is not administered by the user in the administrative role, and (5) providing, via a graphical user interface, a perspective of the computing system to the user that (a) enables the user to administer the computing system by administering the primary component and view information about the secondary component in terms of the primary component and (b) prevents the user from administering the secondary component. Various other methods, systems, and computer-readable media are also disclosed.

20 Claims, 10 Drawing Sheets

(56) References Cited

U.S. PATENT DOCUMENTS

2011/0265188 A1* 10/2011 Ramaswamy ........ G06F 9/4443
726/28

OTHER PUBLICATIONS

Ynn-Pyng Tsaur, et al; Systems and Methods for Simplifying Data Restoration Using Resource Types; U.S. Appl. No. 13/650,054, filed Oct. 11, 2012.
Theodore J. Kaiser, IV, et al; Systems and Methods for Providing Backup Storage Interfaces; U.S. Appl. No. 13/314,557, filed Dec. 8, 2011.
Yiyong Wan, et al.; Systems and Methods for Managing Computing Objects Within Enterprise Software Applications; U.S. Appl. No. 14/138,140, filed Dec. 23, 2013.
"Symantec Cluster Server", http://www.symantec.com/cluster-server/, as accessed Nov. 17, 2013, Symantec Corporation, (Jan. 15, 2012).
"VCenter Server", http://www.vmware.com/products/vcenter-server, as accessed Nov. 17, 2013, VMware, Inc., (Sep. 15, 2009).
"VSphere", http://www.vmware.com/products/vsphere, as accessed Nov. 17, 2013, VMware, Inc., (Mar. 22, 2009).
"Virtual Machine Manager", https://technet.microsoft.com/en-us/library/gg610610.aspx, as accessed Nov. 17, 2013, Microsoft, (Mar. 26, 2011).

* cited by examiner

SYSTEMS AND METHODS FOR ENABLING MULTIPLE-PERSPECTIVE ADMINISTRATION OF COMPUTING SYSTEMS

CROSS REFERENCE TO RELATED APPLICATION

This application claims priority to U.S. Provisional Application No. 61/917,913, titled "PERSPECTIVE-BASED MULTI-TENANT INTERFACE" and filed 18 Dec. 2013, the disclosure of which is incorporated, in its entirety, by this reference.

BACKGROUND

Many organization employ, host, and/or manage complex data centers. Most complex data centers are made up of many different types of components (e.g., server, cluster, storage, virtualization, and application components). Because of the complexity of many data centers, many organizations employ multiple administrators in multiple administrative roles. In some organizations, administrators in one administrative role may be responsible for administering one type of data-center component, while administrators in another administrative role may be responsible for administering another type of data-center component. For example, some organizations may employ server administrators tasked with administering server components, cluster administrators tasked with administering cluster components, storage administrators tasked with administering storage components, virtualization administrators tasked with administering virtualization components, and/or application administrators tasked with administering application components.

Many systems for administering data centers may be directed towards a single administrative role and may be tailored to administer a single type of data-center component. For example, some systems may be tailored towards administering server components, while other systems may be tailored towards administering cluster components. Unfortunately, organizations may need to deploy several of these systems to administer every aspect of their data centers. Moreover if a data-center administrator has multiple administrative roles, the data-center administrator may need to use several systems in order to perform his/her responsibilities.

Some systems for administering data centers attempt to cater to multiple administrative roles by enabling the administration of many types of data-center components via a single interface. Unfortunately, these systems may overload their users with too much information that is not relevant to the users' current responsibilities. Moreover, by attempting to cater to multiple administrative roles via a single interface, these systems often fail to keep in mind the political boundaries that often exist in data centers (e.g., the desires of administrators in one administrative role to limit what information is shared with administrators in other administrative roles). Accordingly, the instant disclosure identifies and addresses a need for additional and improved systems and methods for administering complex computing systems such as data centers.

SUMMARY

As will be described in greater detail below, the instant disclosure describes various systems and methods for enabling multiple-perspective administration of computing systems. In one example, a computer-implemented method for enabling multiple-perspective administration of computing systems may include (1) receiving, from a user, a request to administer a computing system (e.g., a data center) that includes a plurality of types of components, (2) identifying an administrative role of the user, (3) identifying at least one primary component of a primary type of component that is administered by the user in the administrative role, (4) identifying at least one secondary component of a secondary type of component that is not administered by the user in the administrative role, wherein the primary component depends upon the secondary component, and (5) providing, via a graphical user interface, a perspective of the computing system to the user that (a) enables the user to administer the computing system by administering the primary component and view information about the secondary component in terms of the primary component and (b) prevents the user from administering the secondary component. In some embodiments, the information about the secondary component may include only an amount of information necessary for the user to administer the primary component.

In some embodiments, the method may further include (1) receiving, from the user, a request to administer the secondary component, (2) determining that the user has an additional administrative role that permits the user to administer the secondary type of component, and (3) providing, in response to the user having the additional administrative role and via the graphical user interface, an additional perspective of the computing system to the user that (a) enables the user to administer the computing system by administering the secondary component and view information about the primary component in terms of the secondary component and (b) prevents the user from administering the primary component. In at least one embodiment, the perspective may enable the user to navigate to the additional perspective.

In some embodiments, the method may further include (1) receiving, from an additional user, an additional request to administer the computing system, (2) identifying an additional administrative role of the additional user, (3) determining that the additional user is permitted to administer the secondary type of component in the additional administrative role, and (4) providing, via an additional graphical user interface, an additional perspective of the computing system to the additional user that (a) enables the additional user to administer the computing system by administering the secondary component and view information about the primary component in terms of the secondary component and (b) prevents the additional user from administering the primary component.

In some embodiments, the step of identifying the primary component may include identifying a group of primary components of the primary type that the user is permitted to administer, and the perspective may (1) enable the user to administer the group of primary components and (2) prevent the user from administering at least one primary component not contained in the group of primary components.

In some embodiments, the administrative role may include a server administrator role, and the primary type may include host components. In other embodiments, the administrative role may include a cluster administrator role, and the primary type may include cluster components. In one embodiment, the administrative role may include a storage administrator role, and the primary type may include enclosure components. In another embodiment, the administrative role may include a virtualization administrator role, and the primary type may include virtualized-server components. In at least one embodiment, the administrative role may include an application administrator role, and the primary type may include application components.

In one embodiment, a system for implementing the above-described method may include (1) a receiving module, stored in memory, that receives, from a user, a request to administer a computing system that includes a plurality of types of components, (2) a role-identifying module, stored in memory, that identifies an administrative role of the user, (3) a component-identifying module, stored in memory, that identifies (a) at least one primary component of a primary type of component that is administered by the user in the administrative role and (b) at least one secondary component of a secondary type of component that is not administered by the user in the administrative role, wherein the primary component depends upon the secondary component, (4) an interface module, stored in memory, that provides, via a graphical user interface, a perspective of the computing system to the user that (a) enables the user to administer the computing system by administering the primary component and view information about the secondary component in terms of the primary component and (b) prevents the user from administering the secondary component, and (6) at least one processor that executes the receiving module, the role-identifying module, the component-identifying module, and the interface module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, from a user, a request to administer a computing system that includes a plurality of types of components, (2) identify an administrative role of the user, (3) identify at least one primary component of a primary type of component that is administered by the user in the administrative role, (4) identify at least one secondary component of a secondary type of component that is not administered by the user in the administrative role, wherein the primary component depends upon the secondary component, and (5) provide, via a graphical user interface, a perspective of the computing system to the user that (a) enables the user to administer the computing system by administering the primary component and view information about the secondary component in terms of the primary component and (b) prevents the user from administering the secondary component.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
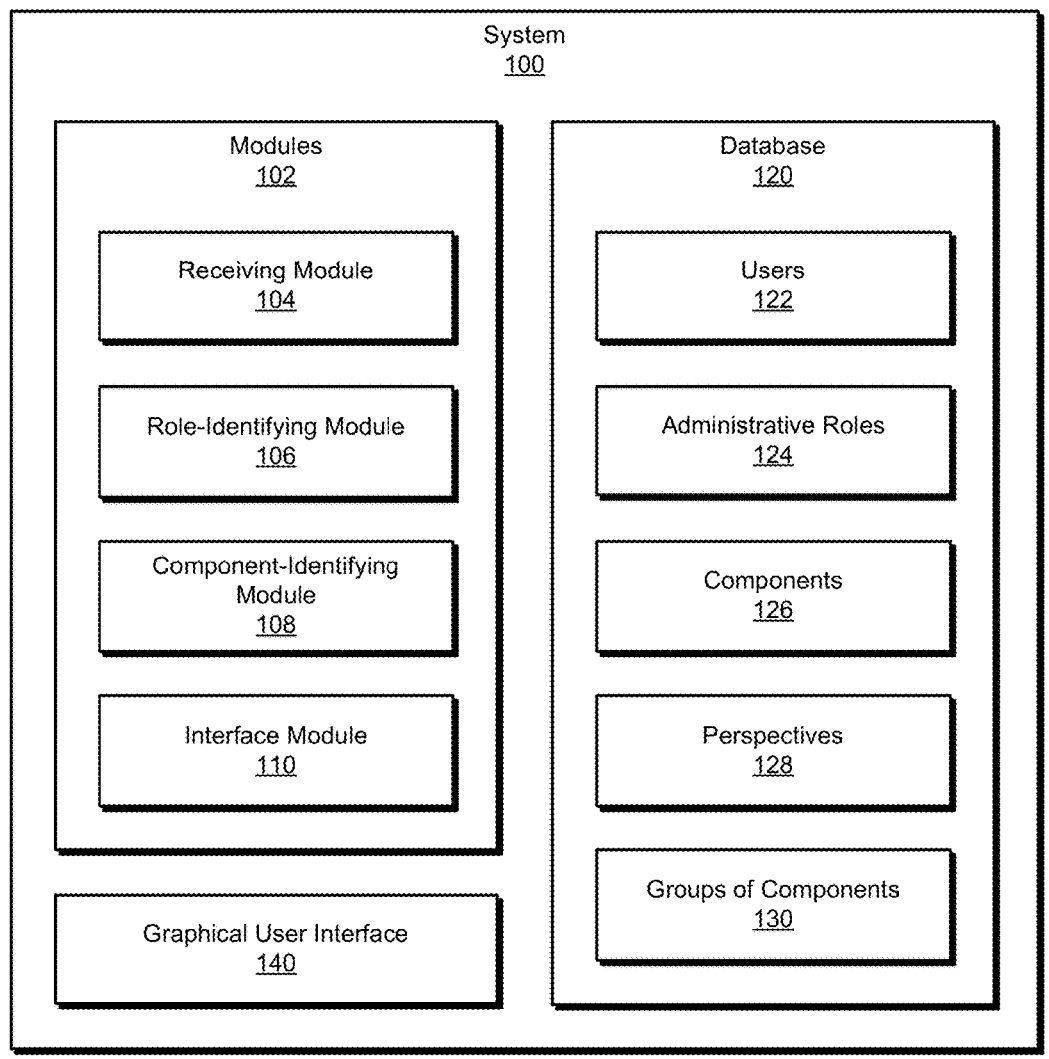
FIG. 1 is a block diagram of an exemplary system for enabling multiple-perspective administration of computing systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for enabling multiple-perspective administration of computing systems. As will be explained in greater detail below, by (1) providing, to administrators of complex computing systems (such as, e.g., data centers), role-based perspectives of the computing systems that are customized for the administrative roles of the administrators and/or by (2) preventing the administrators from viewing any perspectives of the computing systems that are not customized for their administrative roles, the systems and methods disclosed herein may enable administration of the computing systems in a way that does not overload any of the administrators with irrelevant information and/or does preserve the political boundaries that often exist between the administrators of complex computing systems. Embodiments of the instant disclosure may also provide various other advantages and features, as discussed in greater detail below.

Figure 2:
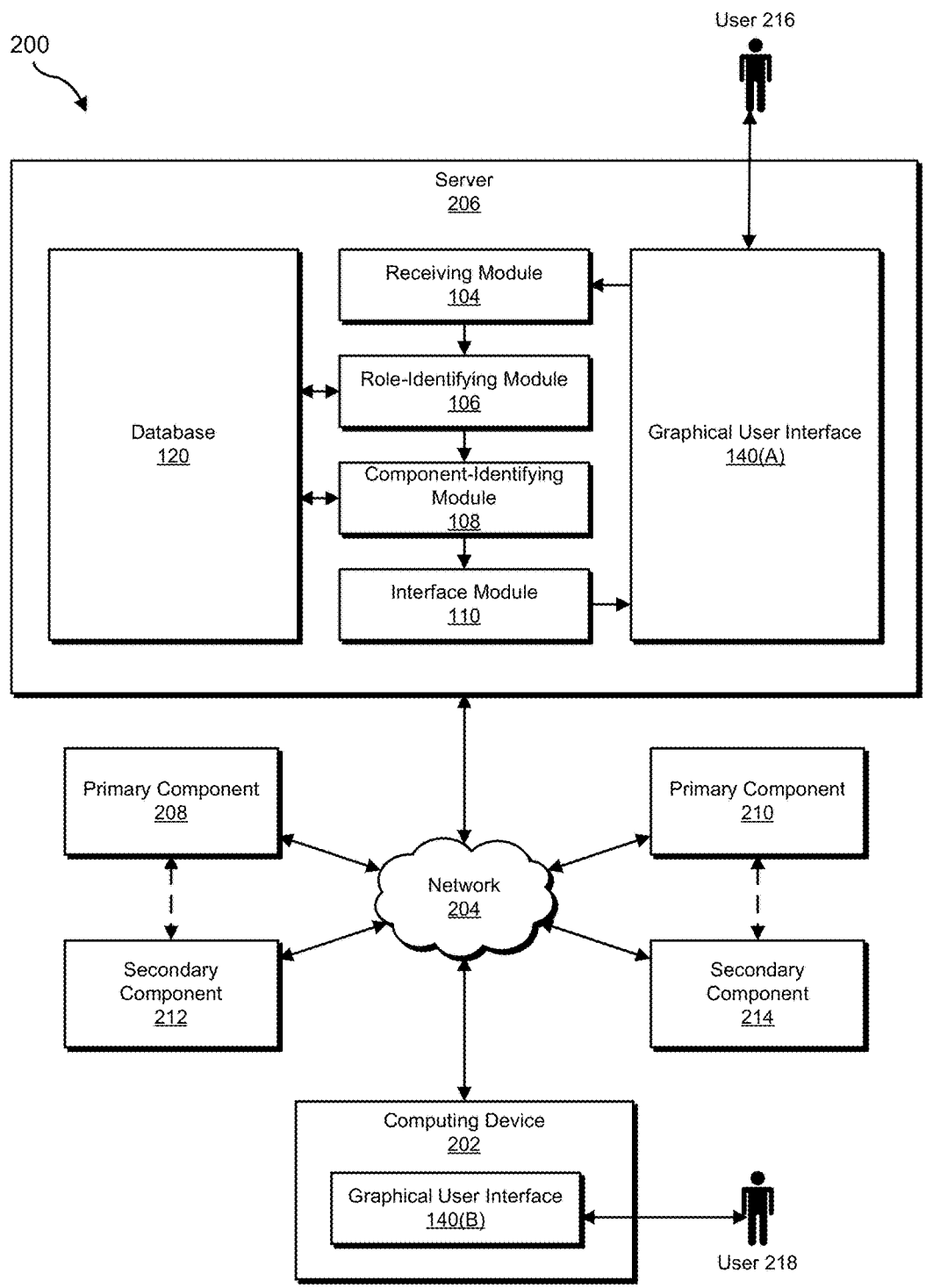
FIG. 2 is a block diagram of an additional exemplary system for enabling multiple-perspective administration of computing systems.

The following will provide, with reference to FIGS. 1-2, detailed descriptions of exemplary systems for enabling multiple-perspective administration of computing systems. Detailed descriptions of corresponding computer-implemented methods will also be provided in connection with FIGS. 3-8. In addition, detailed descriptions of an exemplary computing system and network architecture capable of implementing one or more of the embodiments described herein will be provided in connection with FIGS. 9 and 10, respectively.

FIG. 1 is a block diagram of an exemplary system 100 for enabling multiple-perspective administration of computing systems. As illustrated in this figure, exemplary system 100 may include one or more modules 102 for performing one or more tasks. For example, and as will be explained in greater detail below, exemplary system 100 may include a receiving module 104 that receives, from a user, a request to administer a computing system that includes a plurality of types of components. Exemplary system 100 may also include a role-identifying module 106 that identifies an administrative role of the user.

In addition, and as will be described in greater detail below, exemplary system 100 may include a component-identifying module 108 that (1) identifies at least one primary component of a primary type of component that is administered by the user in the administrative role and (2) identifies at least one secondary component of a secondary type of component that is not administered by the user in the administrative role. Exemplary system 100 may also include an interface module 110 that provides, via a graphical user interface, a perspective of the computing system to the user that (1) enables the user to (a) administer the computing system by administering the primary component and (b) view information about the secondary component in terms of the primary component and (2) prevents the user from administering the secondary component. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 910 in FIG. 9, and/or portions of exemplary network architecture 1000 in FIG. 10. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may store information about one or more users (e.g., users 122), information about one or more administrative roles (e.g., administrative roles 124), information about one or more components (e.g., components 126), information about one or more perspectives (e.g., perspectives 128), and/or information about one or more groups of components (e.g., groups of components 130).

Database 120 may represent portions of a single database or computing device or a plurality of databases or computing devices. For example, database 120 may represent a portion of server 206 in FIG. 2, computing system 910 in FIG. 9, and/or portions of exemplary network architecture 1000 in FIG. 10. Alternatively, database 120 in FIG. 1 may represent one or more physically separate devices capable of being accessed by a computing device, such as server 206 in FIG. 2, computing system 910 in FIG. 9, and/or portions of exemplary network architecture 1000 in FIG. 10.

As illustrated in FIG. 1, exemplary system 100 may include at least one graphical user interface. For example, exemplary system 100 may include graphical user interface 140 (examples of which are illustrated in FIGS. 4-8) for presenting information to and receiving information from a user. As will be explained in greater detail below, the systems described herein may use graphical user interface 140 to provide a perspective of a computing system to a user that (a) enables the user to administer the computing system by administering a primary type of component of the computing system that is associated with an administrative role of the user and view information about other types of components of the computing system in terms of components of the primary type and (b) prevents the user from directly administering the other types of components.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102, may store all or a portion of the data in database 120, and/or may be configured to present graphical user interface 140(B) to a user of computing device 202 (e.g., user 218). Additionally or alternatively, server 206 may be programmed with one or more of modules 102, may store all or a portion of the data in database 120, and/or may be configured to present graphical user interface 140(A) to a user of server 206 (e.g., user 216). In some examples, computing device 202 may represent a computing device with which an administrator of a data center accesses a data-center administration system in order to administer the data center, and server 206 may represent a computing device that hosts the data-center administration application that enables the administrator to administer the data center.

In one embodiment, one or more of modules 102 from FIG. 1 may, when executed by at least one processor of computing device 202 and/or server 206, enable computing device 202 and/or server 206 to enable multiple-perspective administration of computing systems. For example, and as will be described in greater detail below, receiving module 104 may receive, from user 216, a request to administer a computing system that includes at least two types of components (e.g., one type of component that includes primary components 208 and 210, and another type of component that includes secondary components 212 and 214). In this example, primary components 208 and 210 may depend upon secondary components 212 and 214, respectively. In some examples, secondary components 212 and 214 may depend upon primary components 208 and 210, respectively.

Role-identifying module 106 may identify an administrative role of user 216. Component-identifying module 108 may then identify primary component 208 and secondary component 212. In this example, primary component 208 may represent a primary type of component that is administered by user 216 in the administrative role, and secondary component 212 may represent a secondary type of component that is not administered by user 216 in the administrative role. Interface module 110 may then provide, via graphical user interface 140(A), a perspective of the computing system to user 216 that (1) enables user 216 to (a) administer the computing system by administering primary component 208 and (b) view information about secondary component 212 in terms of primary component 208 and (2) prevents user 216 from administering secondary component 212.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 910 in FIG. 9, or any other suitable computing device.

Server 206 generally represents any type or form of computing device that is capable of reading computer-executable instructions and/or managing computing systems. Examples of server 206 include, without limitation, application servers and database servers configured to provide various database services and/or run certain software applications.

Primary components 208 and 210 and secondary components 212 and 214 generally represent any type or form of physical or logical component of a computing system. In at least one example, primary components 208 and 210 and secondary components 212 and 214 may represent any type or form of physical or logical component of a data center. Examples of primary components 208 and 210 and secondary components 212 and 214 include, without limitation, hosts, disk groups, disks, volumes, snapshots, replicated volume groups, initiators, databases, exchange servers, packages, high-availability clusters, service groups, enclosures, array ports, logical unit numbers (LUNs), logical devices (LDEVs), raid groups, fabrics, switches, thin pools, storage ranks, shares, storage volumes, virtualization servers, virtual machines, and datastores.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1000 in FIG. 10, or the like. Network 204 may facilitate communication or data transfer using wireless or wired connections. In one embodiment, network 204 may facilitate communication between computing device 202 and server 206.

Figure 3:
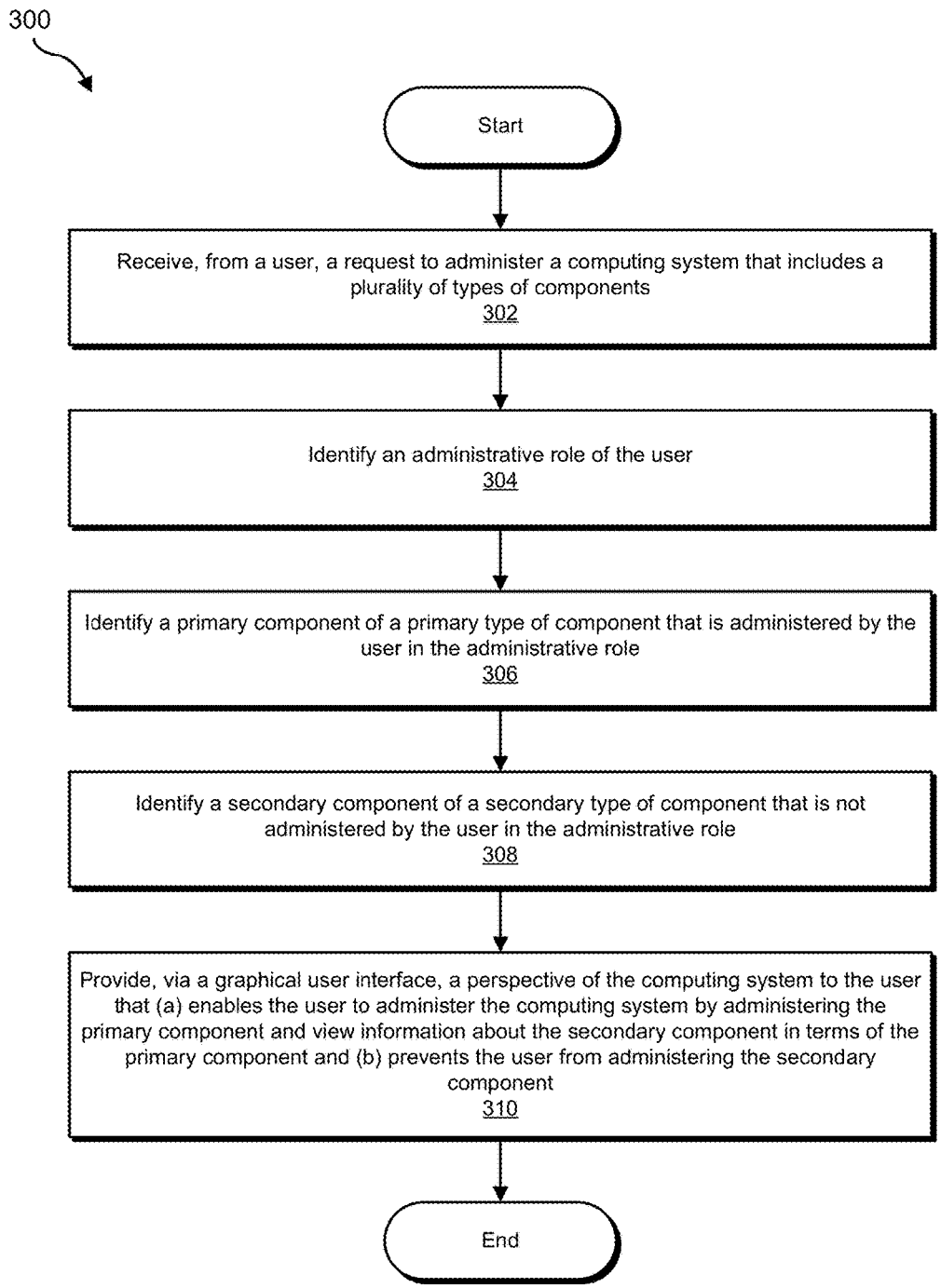
FIG. 3 is a flow diagram of an exemplary method for enabling multiple-perspective administration of computing systems.
Figure 4:
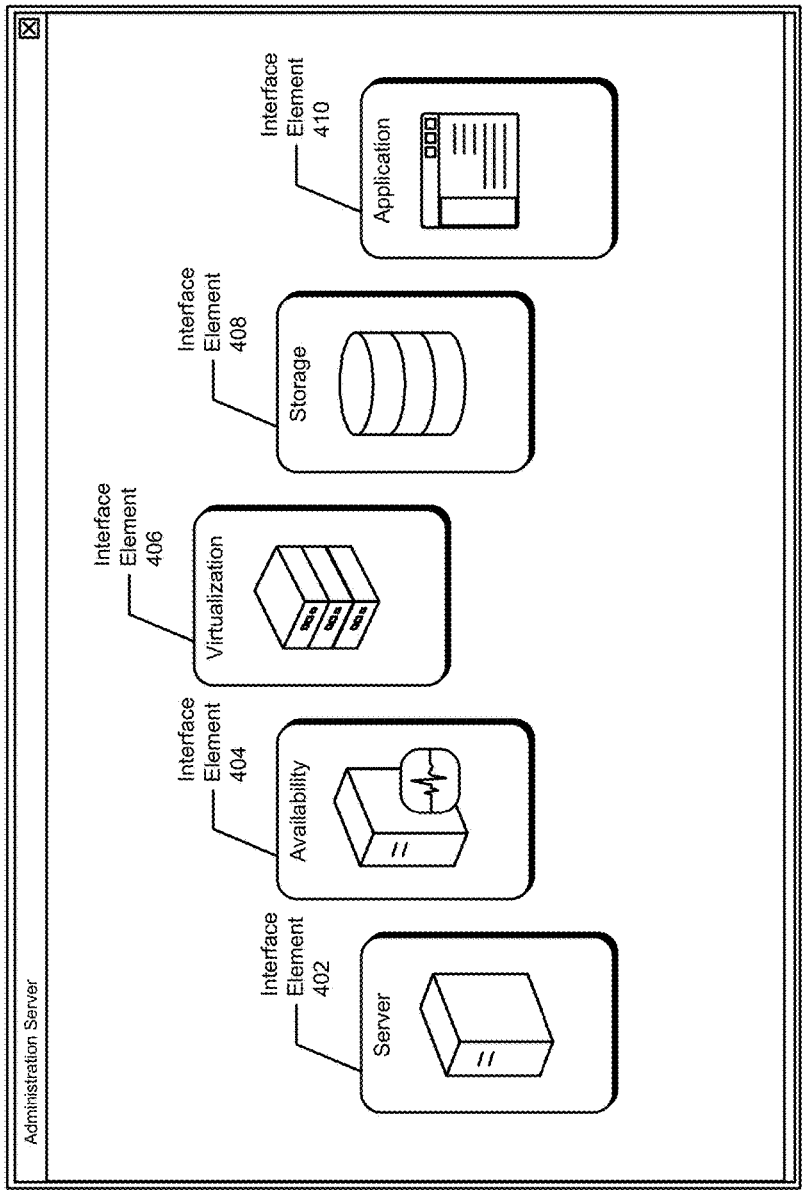
FIG. 4 is a diagram of an exemplary graphical user interface for enabling multiple-perspective administration of computing systems.

FIG. 3 is a flow diagram of an exemplary computer-implemented method 300 for enabling multiple-perspective administration of computing systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 910 in FIG. 9, and/or portions of exemplary network architecture 1000 in FIG. 10.

As illustrated in FIG. 3, at step 302 one or more of the systems described herein may receive, from a user, a request to administer a computing system that includes a plurality of types of components. For example, receiving module 104 may, as part of server 206 in FIG. 2, receive, from user 216, a request to administer a computing system that includes primary components 208 and 210 and secondary components 212 and 214.

As used herein, the term "computing system" generally refers to any complex computing system that includes several different types of physical and/or logical components. For example, the term "computing system" may refer to a physical or virtual data center and/or all or a portion of an organization's or corporation's computing environment (e.g., a computing environment with diverse computing devices). Additionally or alternatively, the term "computing system" may refer to any computing system whose complexity requires and/or encourages administration of the various types of components of the computing system by different administrators in different administrative roles.

The phrase "type of component," as used herein, generally refers to any category of physical or logical components of a computing system. In some examples, the phrase "type of component" may refer to a category that includes all components that are administered by users in a particular administrative role. Examples of types of components include, without limitation, server components (e.g., hosts), cluster components (e.g., clusters), virtualization components (e.g., virtualized servers), storage components (e.g., enclosures), and application components (e.g., applications). The term "component," as used herein, generally refers to any type or form of physical or logical component of a computing system. Examples of components include, without limitation, hosts, disk groups, disks, volumes, snapshots, replicated volume groups, initiators, databases, exchange servers, packages, high-availability clusters, service groups, enclosures, array ports, logical unit numbers (LUNs), logical devices (LDEVs), raid groups, fabrics, switches, thin pools, storage ranks, shares, storage volumes, virtualization servers, virtual machines, and datastores.

Returning to FIG. 3, receiving module 104 may receive a request to administer a computing system from a user in a variety of ways. For example, as mentioned above, one or more of modules 102 may represent an administration application (e.g., a data-center administration application) with which a user may interact using an associated graphical user interface (e.g., graphical user interface 140) to administer a computing system. In such an example, receiving module 104 may receive a request from a user to administer a computing system by detecting that the user has begun interacting with the administration application. For example, receiving module 104 may receive a request from a user to administer a computing system by detecting that the user has launched the application or accessed its associated graphical user interface. In another example, receiving module 104 may receive a request from a user to administer a computing system by detecting that the user has logged into the application.

Additionally or alternatively, receiving module 104 may receive a request from a user to administer a computing system as the result of the user interacting with an interface element (e.g., a button or icon) within a graphical user interface. Using FIG. 4 as an example, receiving module 104 may receive a request from a user that is viewing graphical user interface 400 to administer a computing system by detecting that the user has interacted with (e.g., by clicking on) one of interface elements 402-410. In the example illustrated in FIG. 4, interface elements 402, 404, 406, 408, and 410 may represent interface elements through which a user may request to administer server, cluster, virtualization, storage, and application components of a data center, respectively.

In some examples, the systems described herein may provide, to a user via a graphical user interface, an option to administer a particular type of component within a computing system. In such examples, receiving module 104 may receive a request to administer a computing system from a user by detecting that the user has selected one of the provided options. Using FIG. 4 as an example, the systems described herein may provide, to user 216 via graphical user interface 400, options to administer server, cluster, virtualization, storage, and application components of a data center via interface elements 402, 404, 406, 408, and 410, respectively. In this example, receiving module 104 may receive a request to administer the data center from user 216 by detecting that user 216 has clicked on one of interface elements 402-410.

Figure 5:
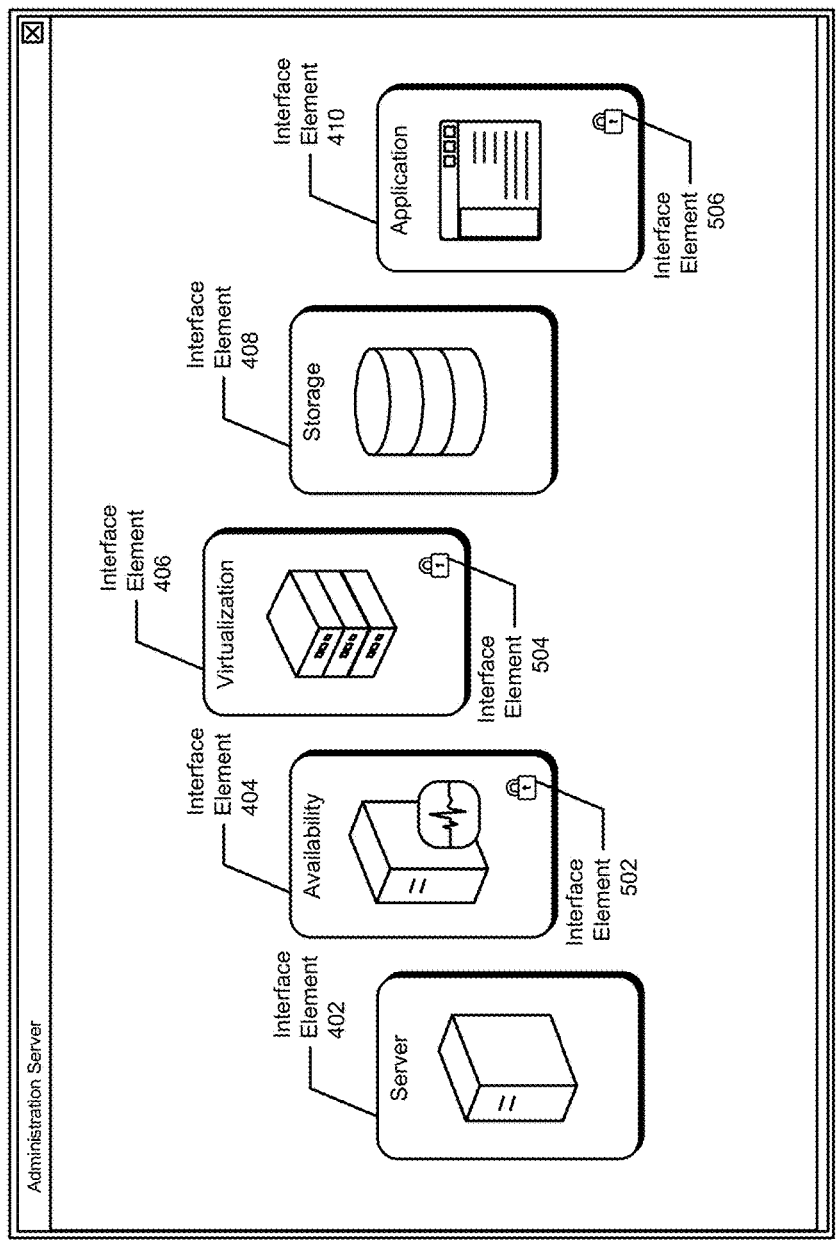
FIG. 5 is a diagram of an exemplary graphical user interface for enabling multiple-perspective administration of computing systems.
Figure 6:
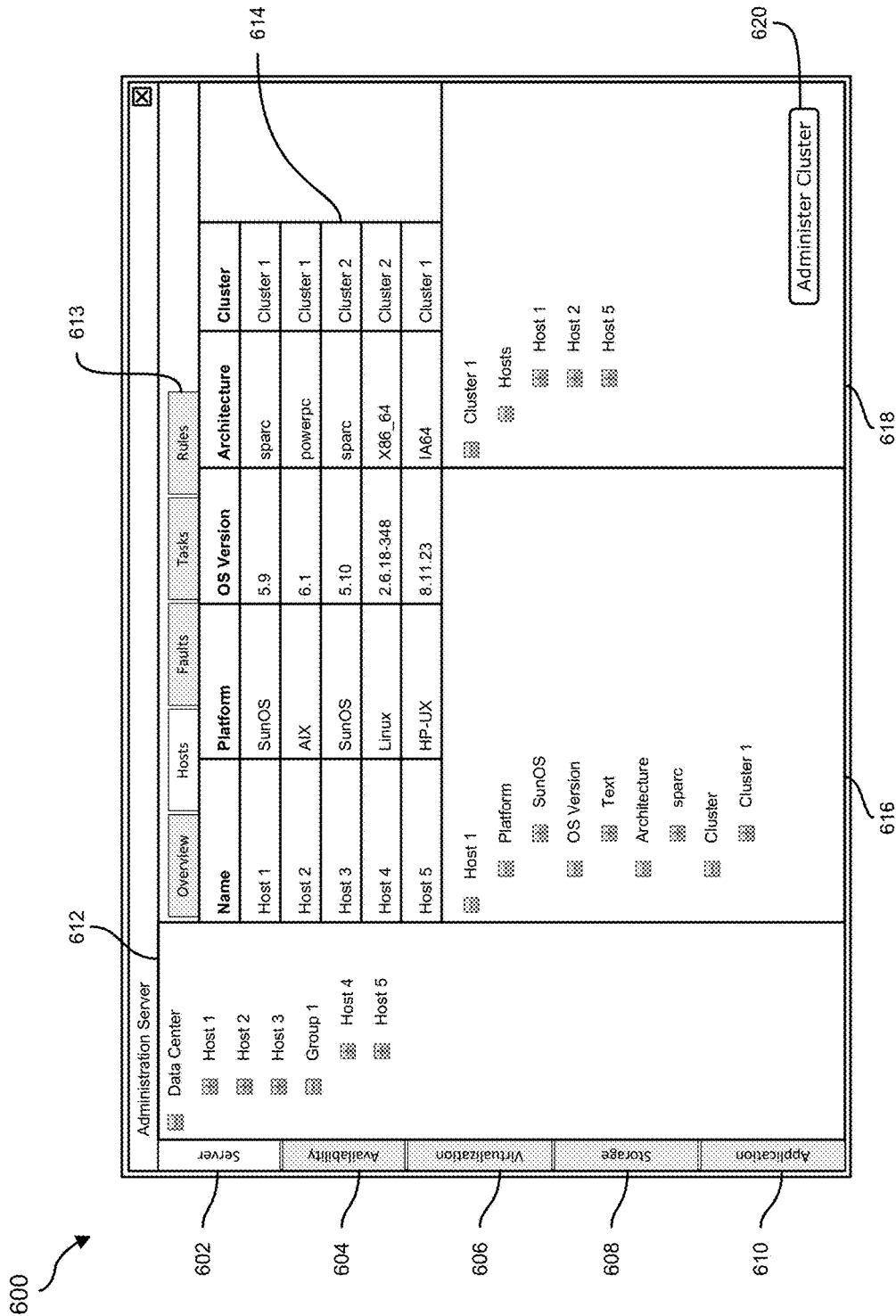
FIG. 6 is a diagram of an exemplary graphical user interface for enabling multiple-perspective administration of computing systems.

In some examples, the systems described herein may provide, to a user via a graphical user interface, an option to administer only the types of components within a computing system that the user is authorized to administer. Using FIG. 5 as an example, the systems described herein may provide, to user 218 via graphical user interface 500, options to administer server and storage components of a data center via interface elements 402 and 408. As shown in FIG. 5, the systems described herein may display interface elements 502, 504, and 506 to user 218 to inform user 218 that user 218 is not authorized to administer cluster, virtualization, and application components in the data center.

Returning to FIG. 3 at step 304, one or more of the systems described herein may identify an administrative role of the user. For example, role-identifying module 106 may, as part of server 206 in FIG. 2, query database 120 to identify an administrative role that has been assigned to user 216.

As used herein, the term "administrative role" generally refers to any role (e.g., a role used for Role-Based Access Control (RBAC)) that may be assigned to a user that authorizes the user to administer one or more types of components within a computing system. Examples of administrative roles may include, without limitation, a server or system administrator role that is authorized to administer server components, a cluster administrator role that is authorized to administer cluster components, a storage administrator role that is authorized to administer storage components, an application administrator role that is authorized to administer application components, a security administrator role that is authorized to administer security components, a backup administrator role that is authorized to administer backup and/or restoration components, and a disaster-recovery administrator role that is authorized to administer disaster-recovery components.

In some examples, the systems described herein may ensure that, when an administrative role is defined for a certain type of component within a computing system, there is also defined an administrative role for every other type of component within the computing system on which the certain type of component depends. For example, the systems described herein may ensure that, if a cluster administrator role is created to enable the administration of cluster components, a host administrator role is also created to enable the administration of the server components that make up the cluster components.

In some examples, the systems described herein may use several different levels of an administrative role (e.g., an administrator level, an operator level, or a guest level) to limit the actions that a user in an administrative role is authorized to perform. Additionally or alternatively, the systems described herein may use several different levels of an administrative role to define a limited number of actions that a user in an administrative role is authorized to perform. In some examples, the actions that a user is authorized to perform while in a particular role may be perspective specific, pre-defined, or customized for the user.

In at least one example, an administrative role that has been assigned to a user may authorize the user to administer only a portion of a particular type of component within a computing system. For example, an administrative role that has been assigned to a user may authorize the user to administer only certain predefined groups of components of a particular type of component within a computing system.

Returning to FIG. 3, role-identifying module 106 may identify an administrative role of a user in a variety of ways. In one example, role-identifying module 106 may identify an administrative role of a user by querying a role-based access control system for administrative roles that have been assigned to the user. Additionally or alternatively, role-identifying module 106 may identify an administrative role of a user by detecting that the user has been assigned permissions that enable the user to administer a type of component in a computing system that is typically administered by users in a particular administrative role. For example, role-identifying module 106 may determine that a user has a server administrator role by detecting that the user has been assigned permissions that enable the user to administer server components in a data center.

At step 306, one or more of the systems described herein may identify a primary component of a primary type of component that is administered by the user in the administrative role. For example, component-identifying module 108 may, as part of server 206 in FIG. 2, identify primary components 208 and 210 that are of a primary type of component that is administered by user 216 in an administrative role of user 216.

As used herein, the phrase "primary type of component" generally refers to a type of component within a computing system that a user administers in a particular administrative role that authorizes the user to administer the type of component. For example, server components may represent the primary type of component of users in server or system administrator roles, cluster components may represent the primary type of component of users in cluster administrator roles, storage components may represent the primary type of component of users in storage administrator roles, application components may represent the primary type of component of users in application administrator roles, security components may represent the primary type of component of users in security administrator roles, backup and/or restoration components may represent the primary type of component of users in backup administrator roles, and disaster-recovery components may represent the primary type of component of users in disaster-recovery administrator roles.

The systems described herein may perform step 306 in any suitable manner. In some examples, component-identifying module 108 may identify primary components of a primary type of component that is administered by a user in an administrative role by (1) determining the primary type of component that is associated with the administrative role and by (2) identifying some or all of the components of the primary type that exist within an computing system being administered. In some example, a user may be authorized to administer certain groups of primary components but not others. In these examples, component-identifying module 108 may identify primary components of a primary type of component that is administered by a user in an administrative role by (1) determining the primary type of component that is associated with the administrative role and by (2) identifying the groups of components of the primary type that the user is authorized to administer.

As mentioned above, one or more of modules 102 may represent an administration application (e.g., a data-center administration application) with which a user may administer a computing system. In such an example, component-identifying module 108 may identify primary components of a primary type of component that is administered by a user in an administrative role by identifying some or all of the components of the primary type that may be administered through the administration application.

At step 308, one or more of the systems described herein may identify a secondary component of a secondary type of component that is not administered by the user in the administrative role. For example, component-identifying module 108 may, as part of server 206 in FIG. 2, identify secondary components 212 and 214 that are of a secondary type of component that is not administered by user 216 in an administrative role of user 216.

As used herein, the phrase "secondary type of component" generally refers to any type of component within a computing system on which components of a primary type of component depend. A primary component may be considered to depend on a secondary component if a change to a configuration or state of the secondary component affects a configuration or state of the primary component and/or if a change to a configuration or state of the primary component affects a configuration or state of the secondary component. In some examples, server, cluster, virtualization, storage, and/or application components may be considered dependent on one another.

The systems described herein may perform step 308 in any suitable manner. In some examples, component-identifying module 108 may identify secondary components of a secondary type of component that is not administered by a user in an administrative role by identifying some or all of the components on which the primary components identified in step 306 depend. Using FIG. 2 as an example, component-identifying module 108 may identify secondary component 212 by determining that primary component 208 depends upon secondary component 212. Similarly, component-identifying module 108 may identify secondary component 214 by determining that primary component 210 depends upon secondary component 214.

Returning to FIG. 3 at step 310, one or more of the systems described herein may provide, via a graphical user interface, a perspective of the computing system to the user that (a) enables the user to administer the computing system by administering the primary component and view information about the secondary component in terms of the primary component and (b) prevents the user from administering the secondary component. For example, interface module 110 may, as part of server 206 in FIG. 2, provide, via graphical user interface 140(A), a perspective to user 216 that (a) enables user 216 to administer primary components 208 and 210 and view information about secondary components 212 and 214 in terms of primary components 208 and 210 and (b) prevents user 216 from administering secondary components 212 and 214.

As used herein, the term "perspective" generally refers to any role-based point-of-view of a computing system that represents how a user working in a particular administrative role mentally views the computing system. In general, interface module 110 may provide a perspective of a computing system to a user that pivots around and/or is in terms of the primary components administered by the user while working in a particular administrative role. For example, interface module 110 may provide a perspective of a data center to a server administrator in terms of server components (e.g., hosts), a perspective of a data center to a cluster administrator in terms of cluster components (e.g., clusters), a perspective of a data center to a virtualization administrator in terms of virtualization components (e.g., virtualized servers), a perspective of a data center to a storage administrator in terms of storage components (e.g., enclosures), and/or a perspective of a data center to an application administrator in terms of application components (e.g., applications).

In some examples, interface module 110 may provide a perspective of a computing system to a user via a graphical user interface that enables the user to administer primary components by enabling the user to search for a particular primary component, view information about the primary components, and/or perform administration actions on the primary components. Using FIG. 6 as an example, interface module 110 may provide, via graphical user interface 600, a server-centric perspective of a data center to a user working as a server administrator that enables the user to browse for a particular host via a hierarchical tree view 612, view detailed information about hosts via host table 614, and/or view detailed information about a single host via host information 616. As shown, interface module 110 may provide, via graphical user interface 600, a server-centric perspective of the data center to the user that enables the user to perform various administration actions on hosts via tabs 613.

In some examples, interface module 110 may provide a perspective of a computing system to a user via a graphical user interface that enables the user to view information about a secondary component in terms of a primary component by relating relevant information (e.g., a predefined set of relevant information) about the secondary component to the primary component that depends upon the secondary component. In some examples, interface module 110 may limit the amount of information that is provided to a user about a secondary component such that no more information is display than is necessary for a user to administer the primary component that depends upon the secondary component. In some examples, interface module 110 may display information about secondary components only in terms of the primary components that depend upon them and/or only in enough detail and quantity to enable a user to administer the primary components. However, because a user may not be authorized to administer the secondary components, interface module 110 may also (1) limit what information about the secondary components the user is able to view and/or (2) prevent the user from administering the secondary components via the perspective. Using FIG. 6 as an example, interface module 110 may provide, via graphical user interface 600, a server-centric perspective of a data center to a user working as a server administrator that enables the user to view information about what cluster a host belongs to via host table 614 and/or view information that indicates what hosts belong to the same cluster via cluster information 618.

In some examples, interface module 110 may provide a perspective of a computing system to a user via a graphical user interface that prevents the user from directly administering secondary components via the perspective by limiting the amount of information about the secondary components that is displayed via the perspective and/or by preventing the user from performing any administration actions on the secondary components via the perspective. Using FIG. 6 as an example, interface module 110 may prevent the user viewing the server-centric perspective provided via graphical user interface 600 from administering any cluster, virtualization, storage, or application components via the server-centric perspective.

Figure 7:
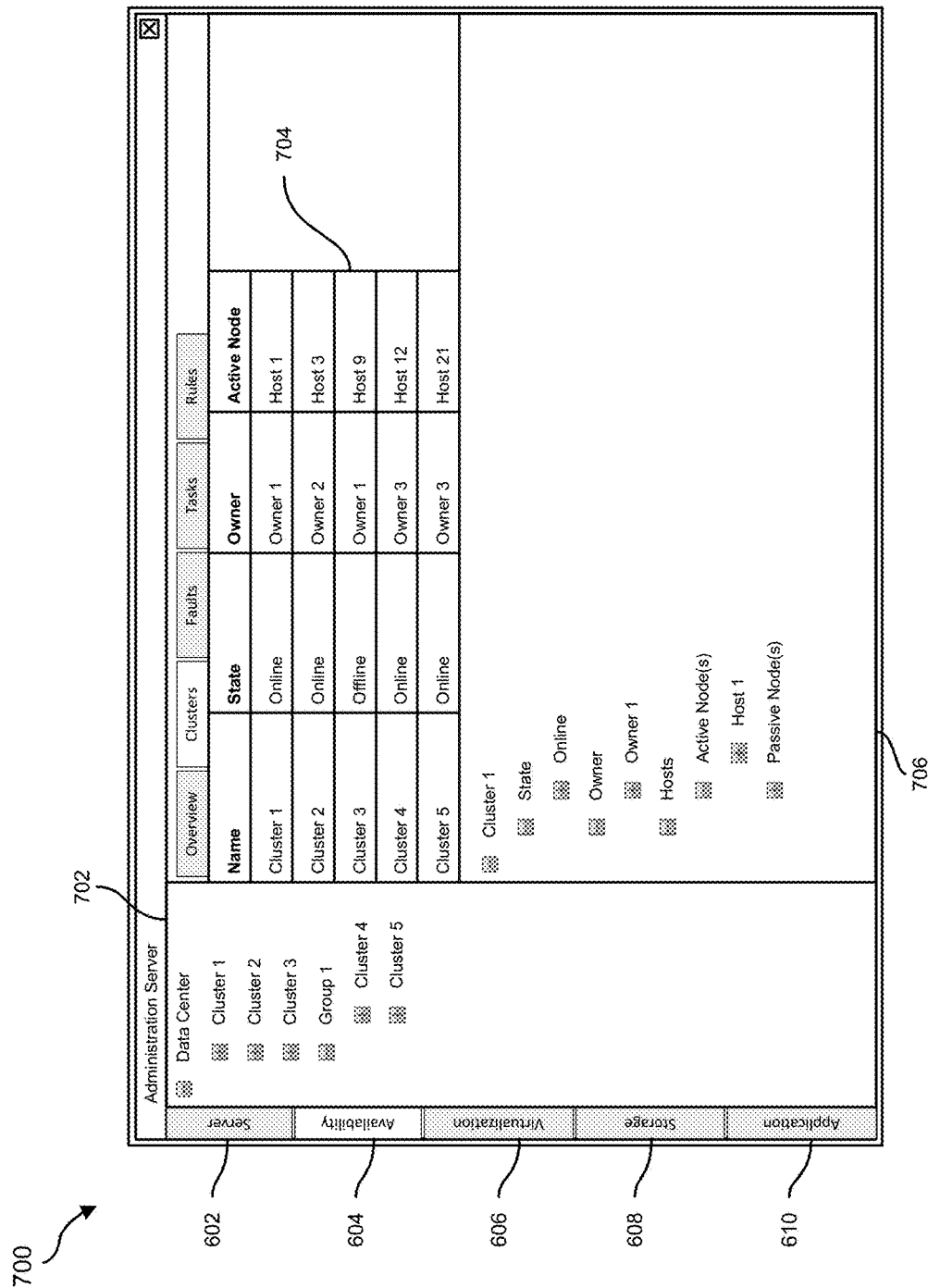
FIG. 7 is a diagram of an exemplary graphical user interface for enabling multiple-perspective administration of computing systems.

In some examples, a user may be assigned several administrative roles. In these situations, interface module 110 may enable the user to easily switch between the perspectives associated with the user's administrative roles. Using FIG. 6 as an example, interface module 110 may enable a user viewing graphical user interface 600 to navigate (e.g., by clicking) between server, cluster, virtualization, storage, and application perspectives via perspective tabs 602, 604, 606, 608, and 610, respectively. In this example, the user viewing graphical user interface 600 may be a server, cluster, virtualization, storage, and application administrator. As shown, interface module 110 may also enable the user viewing graphical user interface 600 to navigate to a cluster perspective via interface element 620. FIG. 7 illustrates an exemplary graphical user interface 700 that interface module 110 may display to the user viewing graphical user interface 600 when the user clicks on either perspective tab 604 or interface element 620. As shown, graphical user interface 700 provides a cluster-centric perspective of a data center that may enable the user to browse for a particular cluster via a hierarchical tree view 702, view detailed information about clusters via cluster table 704, and/or view detailed information about a single cluster via cluster information 706.

Figure 8:
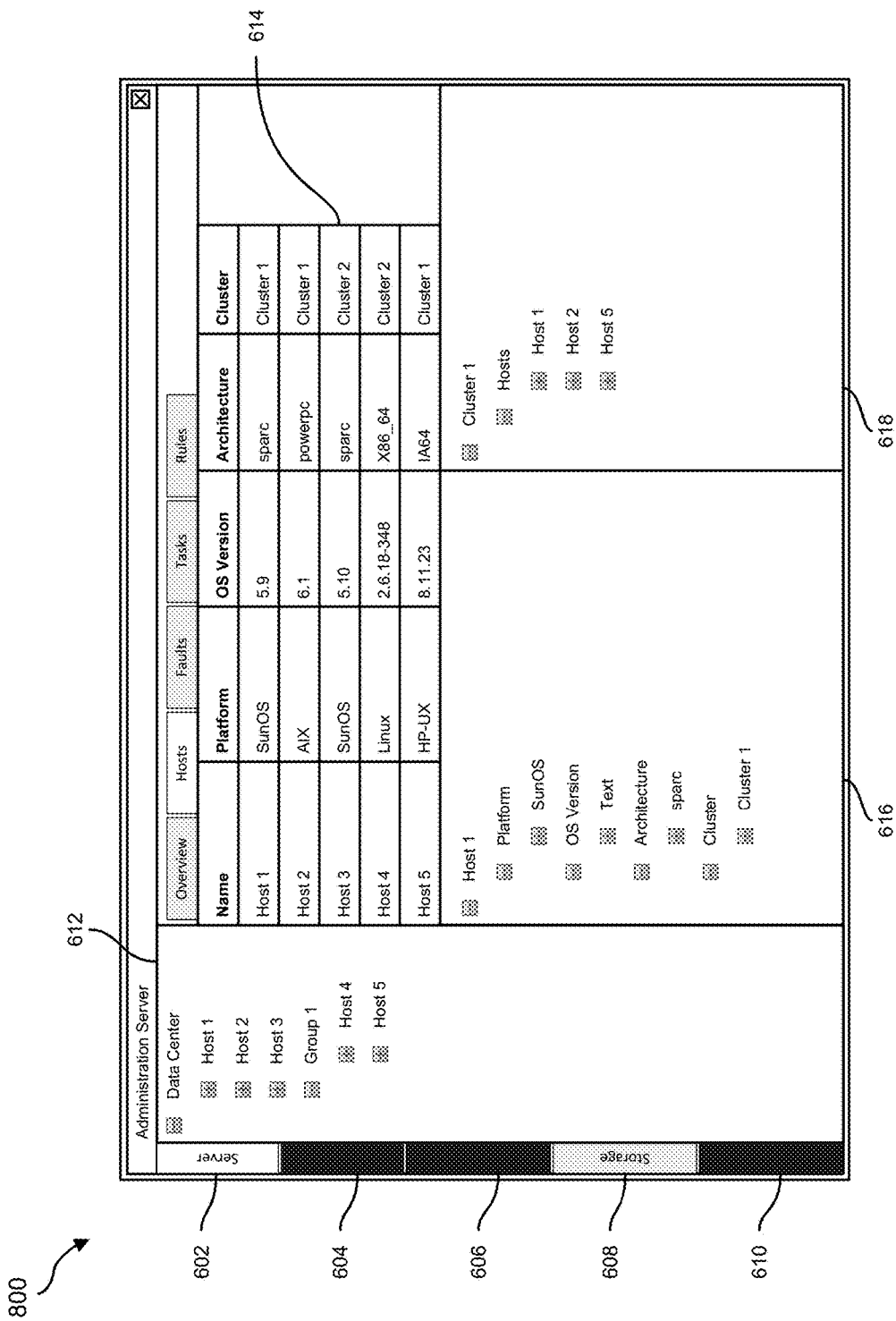
FIG. 8 is a diagram of an exemplary graphical user interface for enabling multiple-perspective administration of computing systems.

Using FIG. 8 as another example, interface module 110 may enable a user viewing graphical user interface 800 to navigate (e.g., by clicking) between server and storage perspectives via perspective tabs 602 and 608, respectively. As shown in FIG. 8, interface module 110 may prevent the user from navigating to a cluster, virtualization, or application perspective by deactivating perspective tabs 604, 606, and 610. In this example, the user viewing graphical user interface 800 may be a server and storage administrator but not a cluster, virtualization, or application administrator.

In some examples, interface module 110 may provide a particular perspective of a computing system to only those users that have been assigned the administrative role for which the perspective is tailored. For example, interface module 110 may provide server perspectives to only system administrators, cluster perspectives to only cluster administrators, virtualization perspectives to only virtualization administrators, storage perspectives to only storage administrators, and application perspectives to only application administrators. By limiting what users are allowed access to the various perspectives of a computing system, the systems described herein may enable an administration application to provide a multi-tenant environment wherein only a subset of users have access to any one perspective of the computing system. Moreover, by limiting what users are allowed access to the various perspectives of a computing system, the systems described herein may maintain the political boundaries that often exist in data centers (e.g., the desires of administrators in one administrative role to limit what information is shared with administrators in other administrative roles).

As indicated above, the systems described herein may use several different levels of administrative roles to limit the administrative actions that a user is authorized to perform. In these examples, interface module 110 may provide a perspective to a user that enables the user to perform only those administrative actions that the user is authorized to perform. As also indicated above, an administrative role that has been assigned to a user may authorize the user to administer only a portion of a particular type of component within a computing system. In these examples, interface module 110 may ensure that the perspective of a computing system that is provided to a user contains only the portion of the particular type of component that the user is authorized to administer. Upon completion of step 310, exemplary method 300 in FIG. 3 may terminate.

As explained above, by (1) providing, to administrators of complex computing systems (such as, e.g., data centers), role-based perspectives of the computing systems that are customized for the administrative roles of the administrators and/or by (2) preventing the administrators from viewing any perspectives of the computing systems that are not customized for their administrative roles, the systems and methods disclosed herein may enable administration of the computing systems in a way that does not overload any of the administrators with irrelevant information and/or does preserve the political boundaries that often exist between the administrators of complex computing systems.

Figure 9:
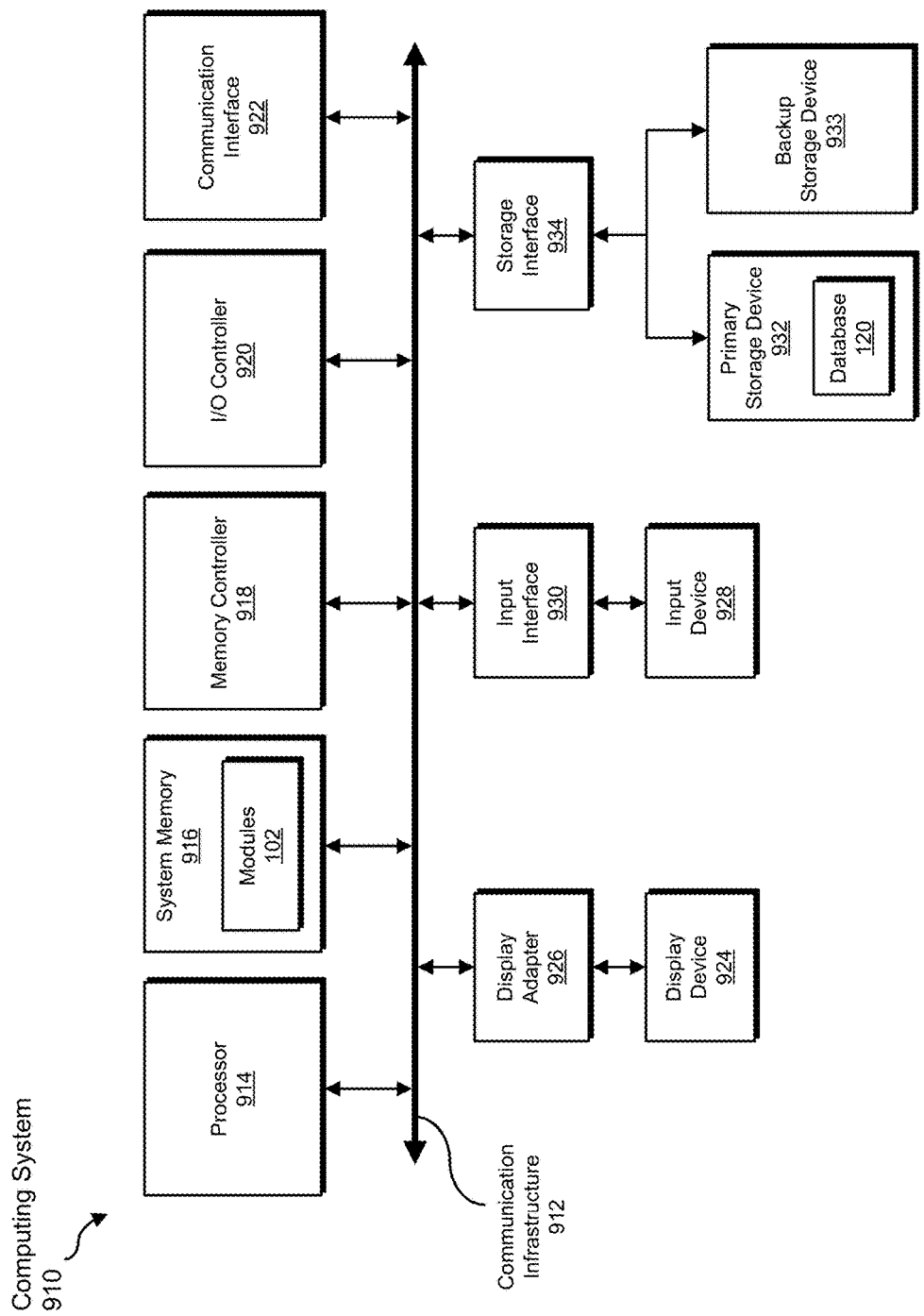
FIG. 9 is a block diagram of an exemplary computing system capable of implementing one or more of the embodiments described and/or illustrated herein.

FIG. 9 is a block diagram of an exemplary computing system 910 capable of implementing one or more of the embodiments described and/or illustrated herein. For example, all or a portion of computing system 910 may perform and/or be a means for performing, either alone or in combination with other elements, one or more of the steps described herein (such as one or more of the steps illustrated in FIG. 3). All or a portion of computing system 910 may also perform and/or be a means for performing any other steps, methods, or processes described and/or illustrated herein.

Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 916.

Processor 914 generally represents any type or form of physical processing unit (e.g., a hardware-implemented central processing unit) capable of processing data or interpreting and executing instructions. In certain embodiments, processor 914 may receive instructions from a software application or module. These instructions may cause processor 914 to perform the functions of one or more of the exemplary embodiments described and/or illustrated herein.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 102 from FIG. 1 may be loaded into system memory 916.

In certain embodiments, exemplary computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI Express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution.

As illustrated in FIG. 9, computing system 910 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also include at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device.

As illustrated in FIG. 9, exemplary computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a solid state drive, a floppy disk drive, a magnetic tape drive, an optical disk drive, a flash drive, or the like. Storage interface 934 generally represents any type or form of interface or device for transferring data between storage devices 932 and 933 and other components of computing system 910. In one example, database 120 from FIG. 1 may be stored in primary storage device 932.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an Application Specific Integrated Circuit (ASIC) adapted to implement one or more of the exemplary embodiments disclosed herein.

Figure 10:
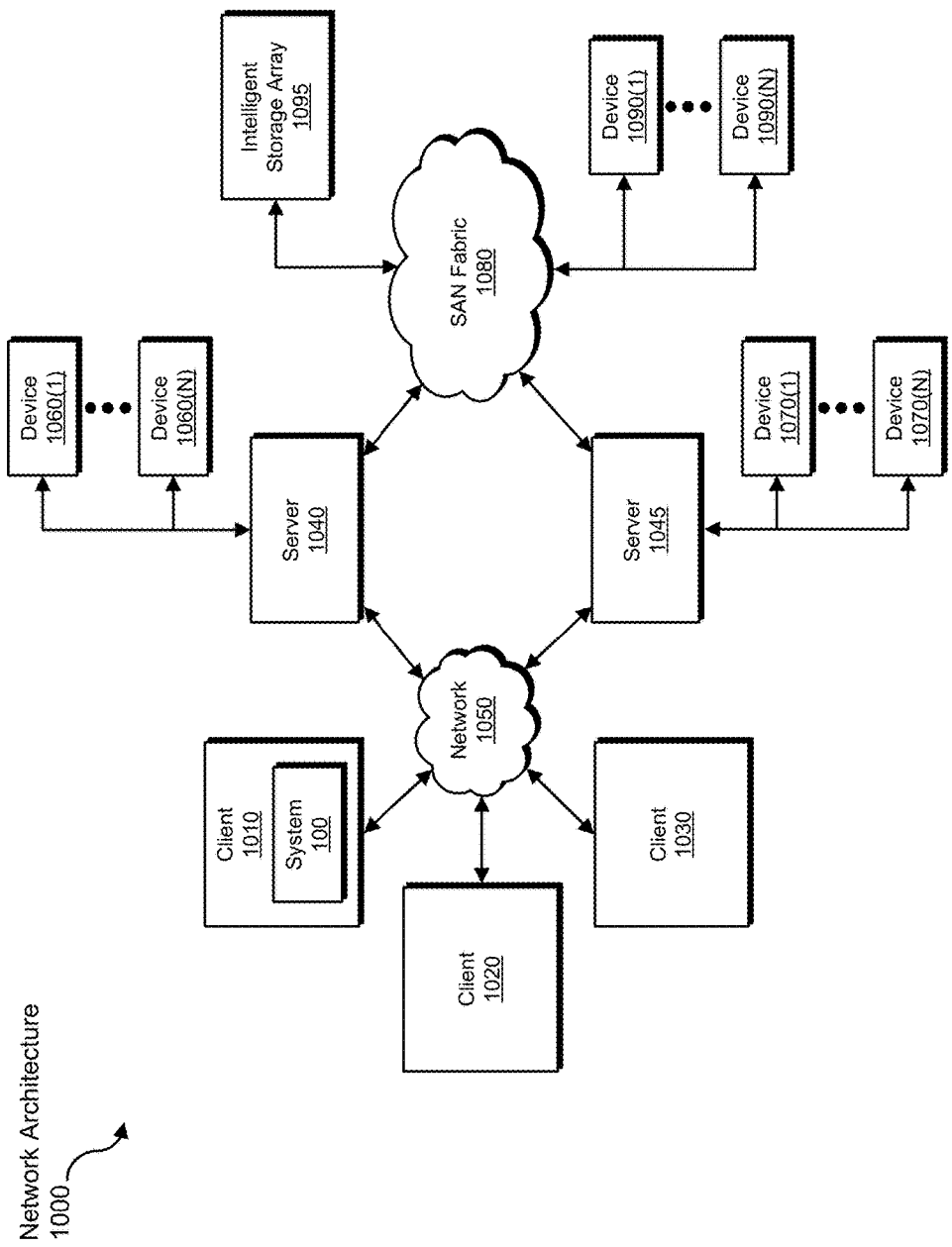
FIG. 10 is a block diagram of an exemplary computing network capable of implementing one or more of the embodiments described and/or illustrated herein.

FIG. 10 is a block diagram of an exemplary network architecture 1000 in which client systems 1010, 1020, and 1030 and servers 1040 and 1045 may be coupled to a network 1050. As detailed above, all or a portion of network architecture 1000 may perform and/or be a means for performing, either alone or in combination with other elements, one or more of the steps disclosed herein (such as one or more of the steps illustrated in FIG. 3). All or a portion of network architecture 1000 may also be used to perform and/or be a means for performing other steps and features set forth in the instant disclosure.

Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or run certain software applications. Network 1050 generally represents any telecommunication or computer network including, for example, an intranet, a WAN, a LAN, a PAN, or the Internet. In one example, client systems 1010, 1020, and/or 1030 and/or servers 1040 and/or 1045 may include all or a portion of system 100 from FIG. 1.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent Network-Attached Storage (NAS) devices configured to communicate with servers 1040 and 1045 using various protocols, such as Network File System (NFS), Server Message Block (SMB), or Common Internet File System (CIFS).

Servers 1040 and 1045 may also be connected to a Storage Area Network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050.

As detailed above, computing system 910 and/or one or more components of network architecture 1000 may perform and/or be a means for performing, either alone or in combination with other elements, one or more steps of an exemplary method for enabling multiple-perspective administration of computing systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may (1) receive a request, from a user, to administer a computing system (e.g., a data center), (2) transform the request into a perspective of the computing system that (a) enables the user to administer the computing system by administering a primary type of component of the computing system that is associated with an administrative role of the user and view information about other types of components of the computing system in terms of components of the primary type and (b) prevents the user from directly administering the other types of components, (3) output a result of the transformation to a graphical user interface that may be displayed to the user, (4) use the result of the transformation to enable the user to configure the computing system, and (5) store a configuration change made via the perspective of the computing system to a configuration file of the computing system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for enabling multiple-perspective administration of computing systems, at least a portion of the method being performed by a computing device comprising at least one processor, the method comprising:
   receiving, from a user, a request to administer a computing system that comprises a plurality of types of components;
   identifying an administrative role of the user;
   determining that the administrative role is associated with a primary type of component that the user is permitted to administer while in the administrative role;
   identifying a secondary type of component whose configuration details are needed by the user to administer components of the primary type and that the user is not permitted to administer while in the administrative role; and
   providing, via a graphical user interface, a perspective of the computing system in terms of components of the primary type to the user that:
      enables the user to:
         administer the computing system by administering a primary component of the primary type; and
         view configuration details of a secondary component of the secondary type in terms of the primary component; and
      prevents the user from administering the secondary component.

2. The method of claim 1, further comprising:
   receiving, from the user, a request to administer the secondary component;
   determining that the user has an additional administrative role that permits the user to administer the secondary type of component; and
   providing, in response to the user having the additional administrative role and via the graphical user interface, an additional perspective of the computing system in terms of components of the secondary type to the user that:
      enables the user to:
         administer the computing system by administering the secondary component; and
         view configuration details of the primary component in terms of the secondary component; and
      prevents the user from administering the primary component.

3. The method of claim 2, wherein the perspective enables the user to navigate to the additional perspective.

4. The method of claim 1, further comprising:
   receiving, from an additional user, an additional request to administer the computing system;
   identifying an additional administrative role of the additional user;
   determining that the additional user is permitted to administer the secondary type of component in the additional administrative role; and
   providing, via an additional graphical user interface, an additional perspective of the computing system in terms of components of the secondary type to the additional user that:
      enables the additional user to:
         administer the computing system by administering the secondary component; and
         view configuration details of the primary component in terms of the secondary component; and
      prevents the additional user from administering the primary component.

5. The method of claim 1, wherein:
   determining that the administrative role is associated with the primary type of component comprises identifying a group of primary components of the primary type that the user is permitted to administer; and
   the perspective:
      enables the user to administer the group of primary components; and
      prevents the user from administering at least one primary component not contained in the group of primary components.

6. The method of claim 1, wherein the configuration details of the secondary component comprises only an amount of information necessary for the user to administer the primary component.

7. The method of claim 1, wherein the administrative role of the user permits the user to administer only one of the plurality of types of components.

8. The method of claim 7, wherein:
   the administrative role comprises a server administrator role; and
   the primary type comprises host components.

9. The method of claim 7, wherein:
   the administrative role comprises a cluster administrator role; and
   the primary type comprises cluster components.

10. The method of claim 7, wherein:
    the administrative role comprises a storage administrator role; and
    the primary type comprises enclosure components.

11. The method of claim 7, wherein:
    the administrative role comprises a virtualization administrator role; and
    the primary type comprises virtualized-server components.

12. The method of claim 7, wherein:
    the administrative role comprises an application administrator role; and
    the primary type comprises application components.

13. A system for enabling multiple-perspective administration of computing systems, the system comprising:
    a receiving module, stored in memory, that receives, from a user, a request to administer a computing system that comprises a plurality of types of components;
    a role-identifying module, stored in memory, that identifies an administrative role of the user;
    a component-identifying module, stored in memory, that:
       determines that the administrative role is associated with a primary type of component that the user is permitted to administer while in the administrative role; and
       identifies a secondary type of component whose configuration details are needed by the user to administer components of the primary type and that the user is not permitted to administer while in the administrative role;

an interface module, stored in memory, that provides, via a graphical user interface, a perspective of the computing system in terms of components of the primary type to the user that:
enables the user to:
administer the computing system by administering a primary component of the primary type; and
view configuration details of a secondary component of the secondary type in terms of the primary component; and
prevents the user from administering the secondary component;
at least one processor that executes the receiving module, the role-identifying module, the component-identifying module, and the interface module.

14. The system of claim 13, wherein:
the receiving module further receives, from the user, a request to administer the secondary component;
the role-identifying module further determines that the user has an additional administrative role that permits the user to administer the secondary type of component; and
the interface module further provides, in response to the user having the additional administrative role and via the graphical user interface, an additional perspective of the computing system in terms of components of the secondary type to the user that:
enables the user to:
administer the computing system by administering the secondary component; and
view configuration details of the primary component in terms of the secondary component; and
prevents the user from administering the primary component.

15. The system of claim 14, wherein the perspective enables the user to navigate to the additional perspective.

16. The system of claim 13, wherein:
the receiving module further receives, from an additional user, an additional request to administer the computing system;
the role-identifying module further:
identifies an additional administrative role of the additional user; and
determines that the additional user is permitted to administer the secondary type of component in the additional administrative role; and
the interface module further provides, via an additional graphical user interface, an additional perspective of the computing system in terms of components of the secondary type to the additional user that:
enables the additional user to:
administer the computing system by administering the secondary component; and
view configuration details of the primary component in terms of the secondary component; and
prevents the additional user from administering the primary component.

17. The system of claim 13, wherein:
the component-identifying module determines that the administrative role is associated with the primary type of component by identifying a group of primary components of the primary type that the user is permitted to administer; and
the perspective:
enables the user to administer the group of primary components; and
prevents the user from administering at least one primary component not contained in the group of primary components.

18. The system of claim 13, wherein the configuration details of the secondary component comprises only an amount of information necessary for the user to administer the primary component.

19. The system of claim 13, wherein the administrative role of the user permits the user to administer only one of the plurality of types of components.

20. A non-transitory computer-readable medium comprising one or more computer-executable instructions that, when executed by at least one processor of a computing device, cause the computing device to:
receive, from a user, a request to administer a computing system that comprises a plurality of types of components;
identify an administrative role of the user;
determine that the administrative role is associated with a primary type of component that the user is permitted to administer while in the administrative role;
identify a secondary type of component whose configuration details are needed by the user to administer components of the primary type and that the user is not permitted to administer while in the administrative role; and
provide, via a graphical user interface, a perspective of the computing system in terms of components of the primary type to the user that:
enables the user to:
administer the computing system by administering a primary component the primary type; and
view configuration details of a secondary component of the secondary type in terms of the primary component; and
prevents the user from administering the secondary component.

* * * * *